W. G. CUMMING.
TIRE INFLATING MECHANISM.
APPLICATION FILED JUNE 4, 1917.

1,312,074.

Patented Aug. 5, 1919.

Inventor.
William Gordon Cumming
By Hanbury A. Budden
Attorney.

UNITED STATES PATENT OFFICE.

WILLIAM GORDON CUMMING, OF MONTREAL, QUEBEC, CANADA.

TIRE-INFLATING MECHANISM.

1,312,074.  Specification of Letters Patent.  Patented Aug. 5, 1919.

Application filed June 4, 1917. Serial No. 172,798.

*To all whom it may concern:*

Be it known that I, WILLIAM GORDON CUMMING, a subject of His Majesty the King of Great Britain and Ireland, and residing at Montreal, Province of Quebec, Dominion of Canada, have invented certain new and useful Improvements in Tire-Inflating Mechanisms, of which the following is a specification.

This invention relates to mechanism for inflating pneumatic tires and has for its object to provide a means by which the weight of the vehicle will operate a device to maintain the necessary air pressure within the tire.

When a tire becomes partially deflated that portion supporting the vehicle becomes flattened, that is, it is forced nearer to the rim.

Various attempts have been made to operate tire pumps by the reciprocation of the tire tread. These devices comprised a cylinder with an inlet valve, a piston with a piston valve, a piston rod connecting the piston with the tire tread.

The intended operation of these devices was that when the cylinder was full of air, drawn in through the inlet valve, and the piston operated by the tread compressed that air, that it would pass through the piston valve into the tire.

It is evident that the air in the cylinder before the stroke of the piston would be at atmospheric pressure. Whereas the air within the tire would be at a much higher pressure. Furthermore it is evident that the piston would have to travel one half the length of the cylinder to raise the pressure to two atmospheres and three quarters of the cylinder length to raise the pressure to four atmospheres.

It will therefore be clear that the interior pressure of the tire will keep the piston valve closed for the greater portion of the travel of the piston.

As a result the slight change of position of the tread would have no effect in inflating the tire and hence would not achieve the desired result.

By the means employed in my invention the slightest reciprocation of the tread will effectually inflate the tire and thereby maintain the desired pressure of inflation.

The device consists of a cylinder normally filled with air directly connected with that in the tire and therefore at the same pressure. The piston when operated by the tread is drawn toward the rim and from the cylinder head thereby creating suction and hence draws air into the end of the cylinder through the inlet valve. When the operating portion of the tread is relieved of the pressure of the vehicle, the piston is forced to the end of the cylinder by the pressure of the air in the tire, increased by the tension of an adjustable coil spring within the cylinder, and the air compressed in the cylinder end is forced through the piston valve and thereby increases the pressure in the tire. In other words the flattening of the tire by the weight of the vehicle is used to suck new air into a pump cylinder which air will be forced past the piston into the chamber connected to the tire, by the return of the piston to its normal position when the weight of the vehicle has passed the operating portion of the tread, and has ceased to flatten that portion.

From this brief account of the means employed it will appear that the slightest movement of the piston will tend to increase the pressure within the tire, and thus maintain a full inflation.

Reference will be made to the drawings hereto annexed in giving the details of one form of the means employed to carry out my invention.

Fig. 3 is a cross section on line Z—Z of Fig. 2.

Figure 1:
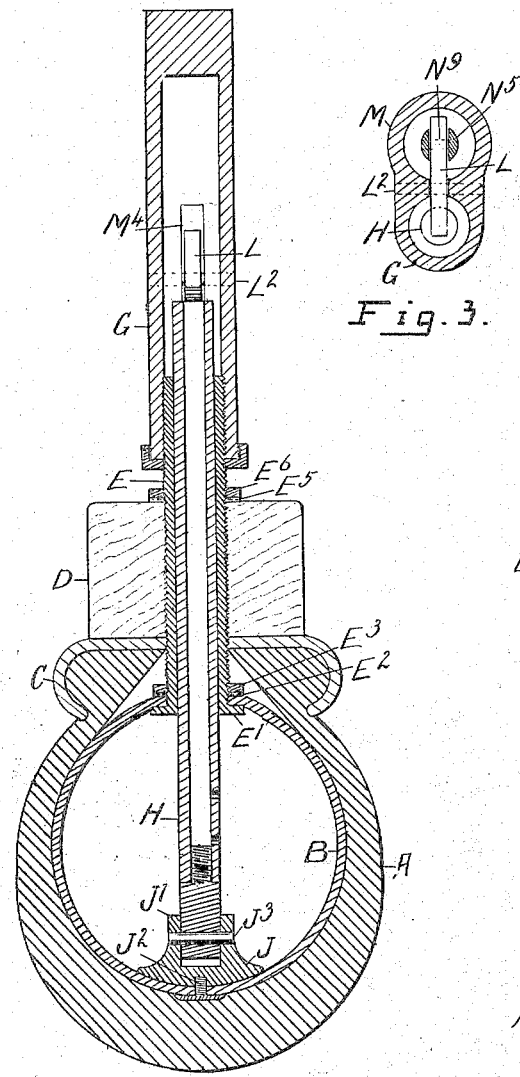
Figure 1 is a sectional view through the center of the plunger.
Figure 2:
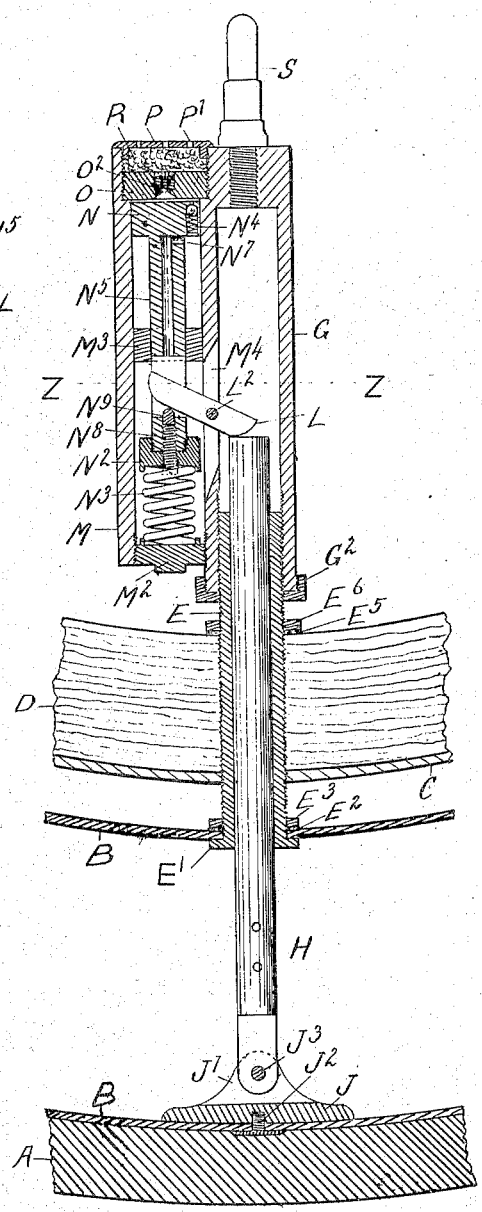
Fig. 2 is a sectional view at right angles to that of Fig. 1, through the same center.

Referring to the drawings A represents the tire, B the inner tube, C the rim and D the felly of an ordinary wheel of a motor car. The usual valve tube through which the inner tube is inflated is replaced by a tube E flanged at $E^1$ and threaded externally. The flanged end is secured to the aperture in the inner tube by the usual washer $E^2$ and nut $E^3$. Through the tube E the plunger H slides freely. The plunger H is hollow and is journaled at its lower end to the button or base J by the pin $J^3$ through the journals $J^1$. A flat headed screw $J^2$ passes through the inner tube B and enters the bottom of the button J, A packing washer E⁵ and nut E⁶ bear directly against the felly D and secure the tube E firmly.

The plunger cylinder G screws over the tube E and the lock nut G² holds it firmly at the proper adjustment.

The cylinder G is closed at its upper end into which an ordinary tire valve S is screwed and by means of which the inner tube may be inflated by the usual means or the air pressure within the tire tested.

The pump cylinder M is adjacent to the cylinder G, and is cast integral with it. The cylinders are connected by the slotted aperture M⁴.

The lever L is journaled in the slot M⁴ by the pin L².

The cylinder head O of the cylinder M has an inlet valve O². A cap P with perforations P¹ forms a chamber R which is filled with suitable material to filter the air passing through the valve O².

The piston N is provided with suitable packing disks or rings and has an inlet valve N⁴.

The piston rod N⁵ is hollow and is perforated at N⁷. The lower end of the rod N⁵ is slotted at N⁶ to receive the end of the lever L.

A cap N² screws over the lower end of the rod N⁵. Through this cap N² an adjustment screw N⁸ passes whereby the hardened steel bar N⁹ can be readily adjusted.

The lower end of the cylinder M is closed by the threaded plug M² and a coil spring N³ between this plug and the cap N² forces the piston N normally against the cylinder head O. The tension of the spring N³ can be adjusted by the position of the plug M².

The plunger is preferably flattened to present a straight edge to the lever L.

The lever L is journaled so that it lowers the piston on limited movements of the plunger, but in the event of an extended thrust of the plunger as the result of a blow out or a violent jar, the end of the lever retires into the slot and the plunger passes into the upper part of the cylinder G. When the plunger H returns to its normal position the lever follows it being forced out of the slot by the spring N³.

From the foregoing description it will appear that at each revolution of the wheel if the tire flattens the plunger will rise, thereby lowering the piston and in so doing will draw air in through the inlet valve O² into the end of the cylinder M.

As the tire resumes its proper curvature the plunger is lowered and the piston is forced upward by pressure of the air in the inner tube increased by the tension of the spring, and the air that was in the end of the cylinder M will pass through the inlet valve N⁴ of the piston and increase the pressure in the inner tube.

By this means a small quantity of air will be brought in whenever the tire becomes at all flattened, while a violent movement of the tire surface will not injure the device or put it out of action.

Having now described my invention what I claim is:

1. In a device of the class described, the combination of a plunger cylinder, a plunger secured at one end to the tread of a tire, a suction pump adjacent to the plunger cylinder, comprising a cylinder with a valve in the cylinder head leading from an air supply, a piston normally in contact with the cylinder head, with a valve therein leading to a passage to the interior of the tire, a lever pivoted in a slot between the cylinders, and a spring bearing on the piston as described.

2. In a device of the class described the combination of a suction pump having the piston normally in contact with the cylinder head and valves in both the piston and the cylinder head between which there is no air space and means to reciprocate the piston thereof.

3. In a device of the class described the combination of a suction pump having the piston normally in contact with the cylinder head and valves in both the piston and the cylinder head between which there is no air space, an air supply passage thereto, a passage therefrom to the interior of the tire and means to reciprocate the piston thereof by the flattening and rebound of a portion of the tire tread.

4. In a device of the class described, the combination of a suction pump, comprising a cylinder, a piston normally in contact with the cylinder head and valves connecting with an air supply and with the interior of the tire, and means to reciprocate the piston by the flattening and rebound of a portion of the tire tread.

5. In a device of the class described, the combination of a suction pump having the piston normally in contact with the cylinder head and valves in both the piston and the cylinder head between which there is no air space, an air passage leading thereto, a filter in said passage, a passage therefrom to the interior of the tire, and means to operate the pump by the flattening of a portion of the tire tread and by the tension of a spring.

6. In a device of the class specified the combination of means to actuate a suction pump by the limited flattening of a portion of the tire tread and a suction pump comprising a cylinder, a piston normally in contact with the cylinder head, a valve in the cylinder head from a passage connecting with the outer air, and a valve in the piston leading to the interior of the tire as described.

7. In a device of the class specified the combination of a cylinder connected with the interior of a tire, an inlet valve in the cylinder head, a piston normally in contact with the cylinder head, an inlet valve in the piston, and means attached to the tire tread adapted to withdraw the piston by the flattening of the tire, and means to return piston when the flattening of that portion ceases.

8. In a device of the class specified the combination of a cylinder provided with an inlet valve in the cylinder head, a piston normally in contact with cylinder head, an inlet valve in piston, means to draw piston from cylinder head when a portion of the tread of the tire is flattened and means to return piston to cylinder head when the flattening of that portion ceases.

9. In a device of the class specified the combination of a suction pump in which the piston is held normally in contact with the cylinder head by the tire pressure in the cylinder and means to reciprocate the piston as described.

In testimony whereof I have affixed my signature.

WILLIAM GORDON CUMMING.